(12) United States Patent
Walther et al.

(10) Patent No.: US 9,518,137 B2
(45) Date of Patent: Dec. 13, 2016

(54) ETHYLENE PROPYLENE-DIENE INTERPOLYMER COMPOSITION

(71) Applicant: Dow Global Technologies LLC, Midland, MI (US)

(72) Inventors: Brian W. Walther, Clute, TX (US); Susan M. Song, High Bridge, NJ (US); Paul J. Caronia, Annadale, NJ (US); Lin Fu, Naperville, IL (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/364,999

(22) PCT Filed: Nov. 30, 2012

(86) PCT No.: PCT/US2012/067257
§ 371 (c)(1),
(2) Date: Jun. 12, 2014

(87) PCT Pub. No.: WO2013/090024
PCT Pub. Date: Jun. 20, 2013

(65) Prior Publication Data
US 2014/0343213 A1      Nov. 20, 2014

Related U.S. Application Data

(60) Provisional application No. 61/570,065, filed on Dec. 13, 2011.

(51) Int. Cl.
| | |
|---|---|
| *C08F 210/18* | (2006.01) |
| *C08K 3/00* | (2006.01) |
| *C08L 23/08* | (2006.01) |
| *C08F 210/02* | (2006.01) |
| *C08F 4/64* | (2006.01) |
| *C08F 210/06* | (2006.01) |
| *C08F 236/20* | (2006.01) |

(52) U.S. Cl.
CPC ......... *C08F 210/02* (2013.01); *C08F 4/64193* (2013.01); *C08F 210/18* (2013.01); *C08K 3/00* (2013.01); *C08L 23/083* (2013.01); *C08F 210/06* (2013.01); *C08F 236/20* (2013.01); *C08F 2500/17* (2013.01); *C08F 2500/25* (2013.01)

(58) Field of Classification Search
CPC ... C08F 210/18; C08F 210/02; C08F 4/64193; C08F 210/06; C08F 236/20; C08F 2500/17; C08F 2500/25; C08K 3/00; C08L 23/083
USPC .......................................................... 524/445
See application file for complete search history.

(56) References Cited

U.S. PATENT DOCUMENTS

| | | |
|---|---|---|
| 5,272,236 A | 12/1993 | Lai et al. |
| 5,952,427 A | 9/1999 | Dharmarajan et al. |
| 6,680,361 B1 * | 1/2004 | Cady ....................... C08F 10/00 502/152 |
| 6,825,253 B2 | 11/2004 | Easter |
| 7,384,994 B2 | 6/2008 | Ortiz et al. |
| 7,511,104 B2 | 3/2009 | Pehlert et al. |
| 7,511,106 B2 | 3/2009 | Ravishankar |
| 7,683,113 B2 | 3/2010 | Easter |
| 7,750,104 B2 | 7/2010 | Cady et al. |
| 7,825,176 B2 | 11/2010 | Kim et al. |
| 2005/0215737 A1 * | 9/2005 | Dharmarajan ........ C08F 210/16 526/170 |
| 2009/0299116 A1 | 12/2009 | Konze et al. |
| 2010/0036069 A1 | 2/2010 | Konze et al. |
| 2011/0015346 A1 | 1/2011 | Hermel-Davidock et al. |
| 2011/0100675 A1 | 5/2011 | Person et al. |
| 2011/0160323 A1 | 6/2011 | Liang et al. |
| 2011/0209897 A1 | 9/2011 | Denton et al. |

OTHER PUBLICATIONS

Welker, Mark F., Rubber World, May 2010, vol. 242, No. 2, p. 18-27.

* cited by examiner

*Primary Examiner* — Angela C Scott
(74) *Attorney, Agent, or Firm* — Husch Blackwell LLP

(57) ABSTRACT

The present disclosure is directed to a composition and articles containing the composition. The composition includes an ethylene-propylene-diene interpolymer (EPDM) having a rheology ratio greater than 33. The EPDM also has a molecular weight distribution greater than 3.0. The composition has a dissipation factor less than or equal to 0.01 radians as measured in accordance with ASTM D 150 (130° C., 60 Hz).

18 Claims, No Drawings

ETHYLENE PROPYLENE-DIENE INTERPOLYMER COMPOSITION

BACKGROUND

The term "ethylene-propylene-diene interpolymer," (or "EPDM") as used herein, is a saturated interpolymer chain composed of units derived from ethylene, propylene, and a diene. EPDM has a wide range of applications, such as insulation for wire and cable, for example. Power utility companies continue to demand power cable with longer service life (40+ years). The dielectric properties of the cable insulation contribute to the service life of power cable. It is known that polymerization residuals and/or impurities can negatively affect the dielectric properties of EPDM, and correspondingly adversely impact the service life of power cable.

The art therefore recognizes the need for EPDM with improved dielectric properties. The art further recognizes the need for reducing polymerization residuals in EPDM while simultaneously maintaining the processability of the EPDM for power cable production.

SUMMARY

The present disclosure provides a composition. In an embodiment, the composition includes an EPDM having a rheology ratio greater than 33. The EPDM also has a molecular weight distribution greater than 3.0. The composition has a dissipation factor less than or equal to 0.01 radians as measured in accordance with ASTM D 150 (130° C., 60 Hz).

In an embodiment, the composition includes from 65 wt % to 90 wt % of the EPDM and from 35 wt % to 10 wt % clay.

The present disclosure provides and article. In an embodiment, the article includes at least one component formed from the EPDM composition.

In an embodiment, the article is a coated conductor. The EPDM composition is a component of the coating that is on the conductor.

DETAILED DESCRIPTION

1. Composition

The disclosure provides a composition. In an embodiment, the composition includes an EPDM. The EPDM has a rheology ratio greater than 33, which indicates that long chain branching is present in the EPDM. The EPDM has a molecular weight distribution (MWD) greater than 3.0. The composition has a dissipation factor less than or equal to 0.01 radians as measured in accordance with ASTM D 150 (130° C., 60 Hz).

In an embodiment, the composition has a dissipation factor from 0.001, or 0.002, or 0.005 to less than or equal to 0.01 radians.

The term "rheology ratio," (RR) as used herein, is the ratio of the interpolymer viscosity measured at 0.1 radian/second (rad/second) to the interpolymer viscosity measured at 100 rad/second. The viscosity is measured in poise at 190° C. under a nitrogen atmosphere using a dynamic mechanical spectrometer such as a RMS-800 or ARES from Rheometrics. The viscosities at 0.1 rad/sec and 100 rad/sec may be represented, respectively, as $V_{0.1}$ and $V_{100}$ with a ratio of the two referred to as "RR" or expressed as $V_{0.1}/V_{100}$. In an embodiment, the EPDM has a rheology ratio of greater than 33, or 34 or 35, to 40, or 50, or 60 or 70.

The EPDM has a MWD greater than 3.0. In a further embodiment, the EPDM has a MWD greater than 3.0, or 3.5, or 4.0 to 6.0, or 6.5, or 7.0, or 7.5, or 8.0.

In an embodiment, the EPDM has a dissipation factor from 0.001, or 0.002, or 0.005 to less than or equal to 0.01 radians.

The EPDM includes units derived from ethylene. The EPDM also includes units derived from propylene. It is understood that olefin monomers other than or in addition to propylene may be utilized in the EPDM. Nonlimiting examples of suitable other olefins for mixture with ethylene include one or more $C_{4-30}$ aliphatic-, cycloaliphatic- or aromatic-compounds (comonomers) containing one or more ethylenic unsaturations. Examples include aliphatic-, cycloaliphatic- and aromatic olefins such as isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, vinylcyclohexane, styrene, cyclopentene, cyclohexene, cyclooctene, and mixtures thereof.

The EPDM includes units derived from a diene monomer. The diene can be conjugated-, non-conjugated-, straight chain-, branched chain- or cyclic-hydrocarbon diene having from 6 to 15 carbon atoms. Nonlimiting examples of suitable diene include 1,4-hexadiene; 1,6-octadiene; 1,7-octadiene; 1,9-decadiene; branched chain acyclic diene, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2, 1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, norbornadiene, 1,4-hexadiene (HD), 5-ethylidene-2-norbornene (ENB), 5-vinylidene-2-norbornene (VNB), 5-methylene-2-norbornene (MNB), and dicyclopentadiene (DCPD).

In an embodiment, the diene is selected from VNB and ENB.

In an embodiment, the diene is ENB.

In an embodiment, the EPDM is neat. The term "neat" as used herein, refers to the EPDM as manufactured and prior to processing, but after exiting the reactor. Stated differently, the neat EPDM is the EPDM before a post-reactor catalyst removal process (if any) occurs. It is understood that solvent washing, post-reactor, typically improves the electrical properties of a polymer.

In an embodiment, the EPDM has a Mooney viscosity greater than 18. In a further embodiment, the EPDM has a Mooney viscosity from 19, or 20 to 25, or 30, or 35.

In an embodiment, the EPDM includes:
(i) from 60 wt %, or 65 wt % to 70 wt %, or 75 wt % units derived from ethylene;
(ii) from 15 wt %, or 20 wt % to 25 wt %, or 30 wt % units derived from propylene; and
(iii) from 0.1 wt %, or 0.3 wt % to 0.5 wt %, or 1.0 wt % units derived from diene. Weight percent is based on the total weight of the EPDM.

The EPDM is made by contacting ethylene, propylene, and the diene with a catalyst, a cocatalyst, and optionally a chain transfer agent under polymerization conditions. The term "polymerization conditions," as used herein are temperature, pressure, reactant concentrations, solvent selection, chain transfer agent, reactant mixing/addition parameters, and/or other conditions within a polymerization reactor that promote reaction between the reagents and formation of the resultant product, namely the EPDM. Catalyst, cocatalyst and optionally chain transfer agent are continuously or intermittently introduced in the polymerization reactor containing the monomers to produce the EPDM.

In an embodiment, the catalyst used to make the present EPDM may be a polyvalent aryloxyether metal complex. A "polyvalent aryloxyether metal complex," as used herein, is a metal complex having the structure (I):

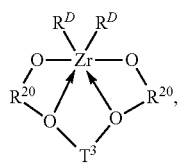

wherein $R^{20}$ independently each occurrence is a divalent aromatic or inertly substituted aromatic group containing from 5 to 20 atoms not counting hydrogen;

$T^3$ is a divalent hydrocarbon or silane group having from 1 to 20 atoms not counting hydrogen, or an inertly substituted derivative thereof; and $R^D$ independently each occurrence is a monovalent ligand group of from 1 to 20 atoms, not counting hydrogen, or two $R^D$ groups together are a divalent ligand group of from 1 to 20 atoms, not counting hydrogen.

In an embodiment, the catalyst is added to the reactor such that the EPDM contains less than 0.3 ppm zirconium or from 0.1 ppm to less than 0.3 ppm zirconium.

In an embodiment, the catalyst is dimethyl[[2',2'''-[1,2-cyclohexanediylbis(methyleneoxy-κO)]bis[3-(9H-carbazol-9-yl)-5-methyl[1,1'-biphenyl]-2-olato-κO]](2-)]-zirconium.

The cocatalyst used to make the present composition is an alumoxane. Nonlimiting examples of suitable alumoxanes include polymeric or oligomeric alumoxanes, such as methylalumoxane (MAO) as well as Lewis acid-modified alumoxanes (MMAO) such as trihydrocarbylaluminum-, halogenated tri(hydrocarbyl)aluminum-modified alumoxanes having from 1 to 10 carbons in each hydrocarbyl or halogenated hydrocarbyl group.

In an embodiment, the alumoxane is introduced into the polymerization reactor such that the EPDM contains less than 3.5 ppm aluminum. In a further embodiment, the EPDM contains from 1.0 ppm, or 2.0 ppm, or 2.5 ppm, to 3.0 ppm or less than 3.5 ppm aluminum.

The catalyst and the cocatalyst are boron-free. Accordingly, in an embodiment, the present composition is boron-free.

2. Additives

The present composition may include one or more optional additives such as clay, filler, plasticizer, wax, thermal stabilizer, antioxidant, lead stabilizer, polyolefin, adhesion promoter, coupling agent, and any combination thereof.

The present composition may be cured, crosslinked, or vulcanized according to known methods.

The present composition may comprise two or more embodiments disclosed herein.

3. Articles

The present composition may be a component of an article such as an extruded article, a thermoformed article, a thermoset article, and any combination thereof.

In an embodiment, the article is an extruded article, i.e., an extrudate. Extrudate irregularities may be classified into two main types: surface melt fracture and gross melt fracture. Surface melt fracture occurs under steady flow conditions and can be identified when the polymer extrudate quality changes from smooth to surface irregularity, through to "sharkskin." Gross melt fracture occurs at unsteady flow conditions and ranges in detail from regular (alternating rough and smooth, helical, etc.) to random distortions. For commercial acceptability, surface defects should be minimal, if not absent.

The onset of surface melt fracture is defined as the loss of extrudate smoothness. The loss of extrudate smoothness is the point at which the surface roughness of the extrudate can be detected by a 10× or higher magnification with the appearance of an unsmooth surface. The surface melt fracture assessment utilizes a Rosand capillary rheometer with a 1 mm diameter die and a 20 mm length with the barrel temperature set to 140° C. Material is loaded into the unit's reservoir and heated for at least 10 minutes to ensure the material is molten. A plunger above the molten material is then lowered between 7.6 to 15 millimeter (mm)/minute to achieve a shear rate of approximately 1000/second. Extrudate samples are collected at a shear rate of approximately 1000/second and evaluated visually for their surface quality.

In an embodiment, the composition includes from 60 wt %, or 65 wt % to 90 wt % of the EPDM and from 40 wt %, or 35 wt % to 25 wt %, or 20 wt %, or 15 wt % or 10 wt % clay where these percentages add to 100 wt %. Weight percent is based on total weight of the composition.

In an embodiment, the composition includes EPDM, clay and one or more of the foregoing additives.

In an embodiment, the composition includes EPDM, from 10 wt % to less than 30 wt % clay, and one or more additives, where the components add to 100 wt %.

In an embodiment, the article is a coated conductor. The coated conductor includes a conductor and a coating on the conductor, the coating formed from the composition containing the EPDM and optional additives as described above. In a further embodiment, the coating is applied to the conductor by way of an extrusion process and may have one or more of the extrudate properties as disclosed above.

A "conductor," as used herein, is one or more wire(s) or fiber(s) for conducting heat, light, and/or electricity. The conductor may be a single-wire/fiber or a multi-wire/fiber and may be in strand form or in tubular form. Nonlimiting examples of suitable conductor include metals such as silver, gold, copper, carbon, and aluminum. The conductor may also be optical fiber made from either glass or plastic.

The coated conductor may be flexible, semi-rigid, or rigid. The coating (also referred to as a "jacket" or a "sheath" or "insulation") is on the conductor or on another polymeric layer around the conductor.

In an embodiment, the coated conductor is a low voltage (less than 5 kV) cable.

In an embodiment, the coated conductor is a medium voltage (5-69 kV) cable.

In an embodiment, the coated conductor is a high voltage (greater than 69 kV) cable.

The present article may comprise two or more embodiments disclosed herein.

DEFINITIONS

The terms "comprising", "including", "having" and their derivatives do not exclude the presence of any additional component, or procedure. The term, "consisting essentially of" excludes any other component or procedure, except those essential to operability. The term "consisting of" excludes any component, procedure not specifically stated.

Density is measured in accordance with ASTM D 792.

Dissipation factor ("DF") is measured according to ASTM D 150 with test frequency set at 60 Hz, testing temperature set at 130° C., applied voltage set at 2 KV, and electrode distance set at 50 mil to test 2.5 inch (6.3 cm) diameter peroxide cured specimens. Prior to the testing, the EPDM is mixed with 0.1 weight percent Irganox™ 1076 [octadecyl 3-(3,5-di-tert-butyl-4-hydroxyphenyl)propionate] and 2.0 weight percent dicumyl peroxide. This mixture is then compression molded into an 8 inch by 8 inch by 50 mil plaque that is crosslinked by maintaining the compression molded sample in the press for a minimum of 12 minutes at 180° C. The crosslinked plaque is placed in a vacuum oven at 60° C. for 1 week to permit the peroxide decomposition by product residues to dissipate from the plaque. The dissipation factor of the material is measured using a Guideline High Voltage Capacitance Bridge. The dissipation factor measurements are conducted with the electrical test cell and plaque at a temperature of 130° C.

Melt index (MI) is measured in accordance with ASTM D 1238, Condition 190° C./2.16 kg (g/10 minutes).

Molecular weight distribution ("MWD")—Polymer molecular weight is characterized by high temperature triple detector gel permeation chromatography (3D-GPC). The chromatographic system consists of a Polymer Laboratories (Amherst, Mass., now part of Varian, Inc, Shropshire, UK) "PL-GPC 210" high temperature chromatograph, equipped with a concentration detector (RI), a Precision Detectors (Amherst, Mass.) 2-angle laser light scattering detector, Model 2040, and a 4-capillary differential viscometer detector, Model 220, from Viscotek (Houston, Tex.). The 15° angle of the light scattering detector is used for calculation purposes.

Data collection is performed using VISCOTEK TriSEC software version 3, and a 4-channel VISCOTEK Data Manager DM400. The system is equipped with an on-line ERC-3415α four channel degasser system from ERC Inc (Tokyo, JP). The carousel compartment is operated at 150° C. for polyethylene and 85° C. for EPDM, and the column compartment is operated at 150° C. The columns are four Polymer Lab Mix-A 30 cm, 20 micron columns. The polymer solutions are prepared in 1,2,4-trichlorobenzene (TCB). The samples are prepared at a concentration of 0.1 grams of polymer in 50 ml of TCB. The chromatographic solvent and the sample preparation solvent contain 200 ppm of butylated hydroxytoluene (BHT). Both solvent sources are nitrogen purged. EPDM samples are stirred gently at 160° C. for one hour. The injection volume is 200 µl, and the flow rate is 1.0 ml/minute.

Calibration of the GPC column set is performed with 21 narrow molecular weight distribution polystyrene standards. The molecular weights of the standards range from 580 to 8,400,000, and are arranged in 6 "cocktail" mixtures, with at least a decade of separation between individual molecular weights. The polystyrene standard peak molecular weights are converted to polyethylene molecular weights using the following equation (as described in Williams and Ward, J. Polym. Sci., Polym. Let., 6, 621 (1968)): Mpolyethylene=A×(Mpolystyrene)$^B$ (1A), where M is the molecular weight, A has a value of 0.39 and B is equal to 1.0. A fourth order polynomial is used to fit the respective polyethylene-equivalent calibration points.

The total plate count of the GPC column set is performed with EICOSANE (prepared at 0.04 g in 50 milliliters of TCB, and dissolved for 20 minutes with gentle agitation.) The plate count and symmetry are measured on a 200 microliter injection according to the following equations:

PlateCount=5.54*($RV$ at Peak Maximum/(Peak width at ½ height))^2  (2A), where RV is the retention volume in milliliters, and the peak width is in milliliters Symmetry=(Rear peak width at one tenth height–$RV$ at Peak maximum)/($RV$ at Peak Maximum–Front peak width at one tenth height)  (3A), where RV is the retention volume in milliliters, and the peak width is in milliliters.

Mooney viscosity ("MV")—Interpolymer MV (ML1+4 at 125° C.) is measured in accordance with ASTM 1646-04, with a one minute preheat time and a four minute rotor operation time. The instrument is an Alpha Technologies Rheometer MDR 2000.

For dual reactor polymerizations in series, the Mooney viscosity of the second reactor component is determined by the following equation: log ML=n(A) log ML(A)+n(B) log ML(B); where ML is the Mooney viscosity of the final reactor product, ML(A) is the Mooney viscosity of the first reactor polymer, ML(B) is the Mooney viscosity of the second reactor polymer, n(A) is the weight fraction of the first reactor polymer, and n(B) is the weight fraction of the second reactor polymer. Each measured Mooney viscosity is measured as discussed above. The weight fraction of the second reactor polymer is determined as follows: n(B)=1−n(A), where n(A) is determined by the known mass of first polymer transferred to the second reactor.

Some embodiments of the present disclosure will now be described in detail in the following Examples.

Examples

1. Comparative Samples

Three comparative samples of Nordel™ IP 3722 are provided from The Dow Chemical Company. Nordel™ IP 3722 is produced with a constrained geometry catalyst and a perfluorinated tri(aryl)boron cocatalyst.

2. Preparation of Examples

Three examples of the present composition are prepared as follows. Ethylene, propylene, and ENB are polymerized in a solution polymerization process using two continuously mixed, loop reactors, operating in series. The catalyst is dimethyl[[2',2'''-[1,2-cyclohexanediylbis(methyleneoxy-κO)]bis[3-(9H-carbazol-9yl)-5-methyl[1,1'-biphenyl]-2-olato-κO]](2-)]-zirconium with an MMAO cocatalyst.

The ethylene is introduced in a mixture of a solvent of ISOPAR E™ (a mixture of C8-C10 saturated hydrocarbons available from ExxonMobil Corporation), propylene and 5-ethylidene-2-norbornene (ENB), forming a first reactor feed stream. The outlet of the first reactor feed stream is consequently a mixture of produced first reactor polymer, solvent, and reduced levels of the initial monomer streams.

The molecular weight of the first reactor polymer (and second reactor polymer) may be controlled by adjusting reactor temperature and/or the addition of a chain terminating agent such as hydrogen. Similar to the first reactor feed stream, additional reactive components are added prior to the second reactor. The polymerization reactions are performed under steady state conditions, that is, constant reactant concentration and continual input of solvent, monomers, and catalyst, and withdrawal of unreacted monomers, solvent and polymer. The reactor system is cooled and pressured to prevent two phase flow at any point in the process.

After polymerization, a small amount of water is introduced into the reactor stream as a catalyst kill, and the reactor exit stream is introduced into a flash vessel, in which the solids concentration is increased by at least 100 percent. A portion of the unreacted monomers, that is, ENB, ethylene, and propylene, and the unused diluent are then collected, and reintroduced into the process as appropriate. Table 1 describes the overall product characterization.

TABLE 1

| | Values |
|---|---|
| First Reactor-Product Targets | |
| Ethylene, wt % | 70.5 |
| ENB, wt % (FTIR) | <1.0 |
| First Reactor-Results | |
| Mooney Viscosity | 43.2 |
| Final-Product Targets | |
| Ethylene, wt % | 71.5 |
| ENB, wt % (FTIR) | <1.0 |
| Final Product Properties | |
| Mooney Viscosity | 18.5 |

In an embodiment, monomers, solvent, catalyst, and MMAO (MMAO serves as a cocatalyst and a water scavenger), are flowed to the first reactor (R1), according to the process conditions in Table 2. The first reactor contents (see Table 2) are flowed to a second reactor (R2) in series. Additional solvent, monomers, catalyst and MMAO are added to the second reactor. The weight percent solids of polymer entering the second reactor is 5.0 percent, by weight, of dry polymer relative to solvent, monomers, and catalyst flows.

TABLE 2

| | R1 | R2 |
|---|---|---|
| Reactor Control Temp. (° C.) | 130 | 105 |
| Solvent (ISOPAR E) Feed (wt %) | 86.4 | 82.1 |
| Ethylene Feed (wt %) | 12.9 | 14.3+ |
| Propylene Feed (wt %) | 5.7 | 8.45+ |
| ENB Feed (wt %) | 0.21 | 0.19+ |
| Hydrogen Feed (wt %) | <0.00001 | 0.000019+ |
| Catalyst Conc. (MM lb poly/lb Zr)* | 0.526 | 3.44 |
| Cocatalyst Conc. (molar ratio to catalyst) | 44 | 45.4 |
| Wt fraction produced in reactor# | 55 | 45 |

*Catalyst addition is defined as one million pounds of polymer produced per pound of Zr in the catalyst.
+Inclusive of the solvent and unreacted components from the first reactor flowing into the second reactor.
Fraction of the total polymer weight produced in the first and second reactor on a dry polymer basis.

Polymerization conditions are monitored and adjusted to maintain cocatalyst metal (aluminum) content in the EPDM from 2.0 ppm to less than 3.5 ppm and catalyst metal (zirconium) from 0.1 ppm to less than 0.3 ppm.

The components and properties for Nordel™ IP 3722 and three examples of the present composition are provided in Table 3 below.

TABLE 3

| | C2 (wt %) | C3 (wt %) | ENB (wt %) | MV | RR* (Rx1) | RR | MWD | DF |
|---|---|---|---|---|---|---|---|---|
| Nordell ™ 3722 | | | | | | | | |
| Comparative Samples (CS) | | | | | | | | |
| CS-1 | 70.85 | 28.69 | 0.46 | 16.7 | 79.6 | 27.4 | 5.47 | 0.063 |
| CS-2 | 70.65 | 28.90 | 0.45 | 22.0 | 82 | 32.1 | 5.45 | 0.099 |
| CS-3 | 71.06 | 28.45 | 0.49 | 18.5 | 84.2 | 29.1 | 6.83 | 0.097 |
| Examples | | | | | | | | |
| Example 1 | 70.74 | 28.89 | 0.37 | 19.0 | 78.7 | 33.3 | 6.35 | 0.005 |
| Example 2 | 70.59 | 28.90 | 0.51 | 18.2 | 89.1 | 33.3 | 5.78 | 0.009 |
| Example 3 | 70.81 | 28.67 | 0.52 | 18.5 | 91.9 | 34.8 | 7.23 | 0.010 |

*Reactor 1
wt % based on total weight of EPDM

Examples 1-3 provide a unique combination of properties: (i) a high level of processability (as indicated by the RR greater than 33) and (ii) improved electrical properties (as indicated by the DF values of less than or equal to 0.010). Furthermore, Examples 1-3 are produced using a two reactor sequential process which results in a well-mixed and uniform final EPDM.

3. Blends

The EPDM of Comparative Sample 2 and the EPDM of Example 3 each is respectively blended with additives in a Brabender™ mixer at a mixer temperature of 140° C. and a rotor speed of 20 rounds per minute (rpm) as shown in Table 4 below. The blending involves adding ⅔ of the EPDM, all the LDPE and the ERD-90 (red lead masterbatch) and fluxing. The clay, Agerite MA (antioxidant), Kadox 920 (thermal stabilizer), PAC-473 (coupling agent) and Antilux 654 (paraffin wax) are added and mixed. Then the remaining EPDM is added and mixed until the EPDM is molten. The Brabender™ rotors are increased to 30 rpm and the material is mixed for 5 minutes. The blended material is removed from the Brabender™ mixer for the capillary rheometer testing.

The components and the properties of the blends are provided in Table 4 below. Column 1 is the control (EPDM of CS-2) and columns 2-3 are examples of the present composition (EPDM of Example 3).

TABLE 4

| Formulation | 1 | 2 | 3 |
|---|---|---|---|
| Nordell ™ 3722 (CS-2) | 53.4 | | |
| Example 3 | | 53.4 | 75.43 |
| 2.3 MI 0.92 g/cc LDPE | 2.67 | 2.67 | 2.67 |
| Agerite MA (antioxidant) | 0.8 | 0.8 | 0.8 |
| Kadox 920 Zinc Oxide (thermal stabilizer) | 3.1 | 3.1 | 3.1 |
| Burgess KE (Translink 37) (clay) | 32.03 | 32.03 | 10 |
| FlowSperse PAC-473 (a 50/50 vinyl tris(2methoxyethoxy)silane-wax mixture) coupling agent | 1.33 | 1.33 | 1.33 |
| Antilux 654 Paraffin Wax | 2.67 | 2.67 | 2.67 |
| Poly-dispersion ERD-90 (lead stabilizer) | 2.67 | 2.67 | 2.67 |
| Extrudate surface (at 140° C., 1000 s − 1) | gross melt fracture | sharkskin | gross melt fracture |
| DF (130° C., 60 Hz) radians | 0.016 | 0.010 | 0.004 |

LDPE = Low density polyethylene
Values in Table 4 are wt %, based on total weight of the formulation Formulations 2-3 exhibit improvement in the extrudate surface quality compared to Control 1. Clay filler is generally used at high levels (typically greater than 30 wt % in conventional Nordell™ 3722 formulations to improve the extrudate quality. However, this conventional amount of clay increases the dissipation factor of the formulation compared to the neat polymer. At the same filler loading, the Formulation 2 exhibits a twofold improvement compared to Control 1. Formulation 2 shows (i) only sharkskin melt fracture (vs gross melt fracture for Control 1) and (ii) a lower DF of 0.010 radians (vs DF of 0.016 radians for Control 1). Formulation 3 shows that the clay loading with the present EPDM can be lowered significantly while maintaining the same extrudate surface quality as Control 1 (10 wt % clay in Formulation 3 vs 32.03 wt % clay in Control 1). Noteworthy is that each of Formulation 2 and 3 has a lower DF than Control 1.

An advantage of the present disclosure is that utilization of the present EPDM enables the clay filler loading to be lowered while maintaining better extrudate quality than Control 1. The present EPDM enables the manufacture of a coated conductor (i.e., power cable) using less (or no) clay filler loading resulting in lower dissipation factor and improved extrudate surface quality when compared to coated conductor utilizing Nordell™ 3722 and clay.

What is claimed is:

1. A composition comprising:
an ethylene-propylene-diene interpolymer with from 0.1 wt % to 1.0 wt % units derived from diene, the interpolymer having a rheology ratio greater than 33; and a molecular weight distribution greater than 3.0;
the composition having a dissipation factor less than or equal to 0.01 radians as measured in accordance with ASTM D 150 at a temperature of 130° C., and a frequency of 60 Hz after one week of vacuum oven heating at 60° C.

2. The composition of claim 1 wherein the ethylene-propylene-diene interpolymer is neat.

3. The composition of claim 1 wherein the ethylene-propylene-diene interpolymer comprises less than 3.5 ppm aluminum.

4. The composition of claim 1 wherein the ethylene-propylene-diene interpolymer has a Mooney viscosity greater than 18.

5. The composition of claim 1 wherein the ethylene-propylene-diene interpolymer comprises
from 60 wt % to 75 wt % units derived from ethylene;
from 15 wt % to 30 wt % units derived from propylene; and
from 0.1 wt % to 1.0 wt % units derived from diene.

6. The composition of claim 1 wherein the diene is selected from the group consisting of 5-ethylidene-2-norbornene and 5-vinylidene-2-norbornene.

7. The composition of claim 1 wherein the ethylene-propylene-diene interpolymer has a dissipation factor less than or equal to 0.01 radians as measured in accordance with ASTM D 150 at a temperature of 130° C., and a frequency of 60 Hz after one week of vacuum oven heating at 60° C.

8. The composition of claim 1 comprising
from 65 wt % to 90 wt % of the ethylene-propylene-diene interpolymer; and
from 35 wt % to 10 wt % clay.

9. The composition of claim 8 comprising an additive selected from the group consisting of filler, plasticizer, wax, thermal stabilizer, antioxidant, lead stabilizer, polyolefin, adhesion promoter, coupling agent, and combinations thereof.

10. An article comprising at least one component formed from the composition of claim 1.

11. The composition of claim 1 wherein the ethylene-propylene-diene interpolymer has a molecular weight distribution from 4.0 to 8.0.

12. The composition of claim 1 wherein the ethylene-propylene-diene interpolymer comprises
from 1.0 ppm to less than 3.5 ppm aluminum; and
from 0.1 ppm to less than 0.3 ppm zirconium.

13. The composition of claim 1 wherein the ethylene-propylene-diene interpolymer has a rheology ratio from greater than 33 to 70.

14. The composition of claim 1 wherein the composition is boron-free.

15. The composition of claim 1 wherein the diene is 5-ethylidene-2-norbornene and the composition comprises
from 10 wt % to less than 30 wt % clay; and
an additive selected from the group consisting of filler, plasticizer, wax, thermal stabilizer, antioxidant, lead stabilizer, polyolefin, adhesion promoter, coupling agent, and combinations thereof.

16. A composition comprising:
an ethylene-propylene-diene interpolymer comprising
(i) from 60 wt % to 75 wt % units derived from ethylene;
(ii) from 15 wt % to 30 wt % units derived from propylene;
(iii) from 0.1 wt % to 1.0 wt % units derived from diene; and
(iv) from 1.0 ppm to less than 3.5 ppm aluminum; and from 0.1 ppm to less than 0.3 ppm zirconium
wherein the ethylene-propylene-diene interpolymer has
a rheology ratio greater than 33;
a dissipation factor less than or equal to 0.01 radians as measured in accordance with ASTM D 150 at a temperature of 130° C. and a frequency of 60 Hz after one week of vacuum oven heating at 60° C.; and
a molecular weight distribution greater than 3.0; and
the composition has a dissipation factor less than or equal to 0.01 radians after one week as measured in accordance with ASTM D 150 at a temperature of 130° C., and a frequency of 60 Hz.

17. The composition of claim 16 wherein the ethylene-propylene-diene interpolymer comprises
from 65 wt % to 75 wt % units derived from ethylene;
from 20 wt % to 30 wt % units derived from propylene; and
from 0.3 wt % to 1.0 wt % units derived from diene.

18. The composition of claim 17 comprising
from 65 wt % to 90 wt % of the ethylene-propylene-diene interpolymer; and
from 35 wt % to 10 wt % clay.

* * * * *